US012292013B2

(12) United States Patent
Hegge et al.

(10) Patent No.: US 12,292,013 B2
(45) Date of Patent: May 6, 2025

(54) PISTON ASSEMBLY WITH GAPLESS OIL CONTROL RING

(71) Applicant: DeltaHawk Engines, Inc., Racine, WI (US)

(72) Inventors: Graydon Robert Hegge, Madison, WI (US); Aaron Gamache Foege, Kansasville, WI (US); Frank Matthew Graczyk, Darien, IL (US)

(73) Assignee: DeltaHawk Engines, Inc., Racine, WI (US)

( * ) Notice: Subject to any disclaimer, the term of this patent is extended or adjusted under 35 U.S.C. 154(b) by 0 days.

(21) Appl. No.: 18/343,909

(22) Filed: Jun. 29, 2023

(65) Prior Publication Data

US 2024/0003314 A1 Jan. 4, 2024

Related U.S. Application Data

(60) Provisional application No. 63/356,710, filed on Jun. 29, 2022.

(51) Int. Cl.
*F02F 5/00* (2006.01)
*F02B 75/02* (2006.01)
*F02F 3/00* (2006.01)

(52) U.S. Cl.
CPC ................ *F02F 5/00* (2013.01); *F02B 75/02* (2013.01); *F02F 3/0015* (2013.01); *F02B 2075/025* (2013.01)

(58) Field of Classification Search
CPC .................................. F02F 3/0015; F02F 5/00
See application file for complete search history.

(56) References Cited

U.S. PATENT DOCUMENTS 1,476,657 A * 12/1923 Tawney ..................... F16J 9/16 277/489
1,545,274 A * 7/1925 Panyard ................... F16J 9/063 277/489
1,556,104 A * 10/1925 James ........................ F16J 9/06 277/489

(Continued)

OTHER PUBLICATIONS

MS Motorservice International GMBH, "Piston Rings for Combustion Engines," believed to be available at least as early as Oct. 2018, 80 pages.

(Continued)

*Primary Examiner* — Kevin A Lathers
(74) *Attorney, Agent, or Firm* — Reinhart Boerner Van Deuren s.c.

(57) ABSTRACT

A piston is provided with a gapless ring positioned in a subport position. Specifically, the gapless ring is positioned between the air ports and the crankcase of the engine. The gapless ring includes a rail and an annular ring received within the rail. The ring includes a ring gap and the rail includes a rail gap. When the rail receives the annular ring, the ring gap and rail gap are spaced apart in a circumferential direction such that the gaps do not overlap. In certain embodiments, the rail includes a notch. When the annular ring is received within the notch, the annular ring and rail are biased against rotating with respect to each other. In certain other embodiments, the gapless ring includes an oil scraping surface.

20 Claims, 11 Drawing Sheets

(56) References Cited

U.S. PATENT DOCUMENTS

| | | | | | |
|---|---|---|---|---|---|
| 2,589,274 | A * | 3/1952 | Moratta | F16J 9/061 | 277/494 |
| 2,757,057 | A * | 7/1956 | Sanon | F16J 9/16 | 277/489 |
| 3,587,155 | A * | 6/1971 | Packard | F16J 9/20 | 277/924 |
| 6,712,363 | B2 * | 3/2004 | Bennitt | F16J 9/06 | 277/548 |
| 7,267,602 | B2 | 9/2007 | Moriarty et al. | | |
| 11,313,467 | B1 | 4/2022 | Hartford et al. | | |
| 2006/0249913 | A1 * | 11/2006 | Nessa | F16J 9/16 | 277/493 |
| 2016/0069455 | A1 | 3/2016 | Hartford et al. | | |
| 2017/0276246 | A1 * | 9/2017 | Graczyk | F16J 9/12 | |

OTHER PUBLICATIONS

Total Seal Piston Rings, "HSS Diesel Rings," https://www.totalseal.com/rings/gapless-diesel-rings, believed to be available at least as early as Oct. 30, 2020, 2 pages.

"Video 19 Total Seal Tech Time Gapless Top Ring or Gapless Second Ring," YouTube, Aug. 3, 2017, https://www.youtube.com/watch?v=W9Nu5dWz_5o, 1 page.

* cited by examiner

PISTON ASSEMBLY WITH GAPLESS OIL CONTROL RING

CROSS-REFERENCE TO RELATED PATENT APPLICATION

This application claims the benefit of and priority to U.S. Provisional Application No. 63/356,710 titled "Piston Assembly with Gapless Oil Control Piston Ring," filed on Jun. 29, 2022, which is incorporated herein by reference in its entirety.

BACKGROUND OF THE INVENTION

The present invention relates generally to the field of engines. The present invention relates specifically to a piston assembly for use with a diesel engine.

SUMMARY OF THE INVENTION

One embodiment of the invention relates to an inverted V-block, two-stroke engine that includes a crankcase, a cylinder, a piston, and a ring assembly. The cylinder is coupled to the crankcase and extends away from the crankcase along an axis. The cylinder is centered on the axis. The piston is also centered on and extends along the axis. The piston includes a piston head and a piston skirt. The piston skirt extends between the piston head and the crankcase. The piston skirt has a first end and a second end opposite from the first end. The second end is adjacent to the crankcase. The ring assembly is coupled to the second end of the piston. The ring assembly includes a rail and an annular ring. The rail extends circumferentially around the axis and defines a rail gap within the rail. The annular ring extends circumferentially around the axis and defines a ring gap within the annular ring. The rail gap and ring gap are circumferentially spaced apart from each other such that the ring gap is not aligned with the rail gap in a direction parallel to the axis.

Another embodiment of the invention relates to a piston assembly for use within a cylinder of a diesel engine. The piston assembly includes a piston head, a piston skirt, a rail, and a ring. The piston head defines a central axis. The piston skirt is centered on and extends along the central axis. The piston skirt has a first end and a second end. The first end is coupled to the piston head. The rail is coupled proximate to the second end of the piston skirt and extends circumferentially around the central axis. The piston skirt defines a rail gap within the rail and a notch. The ring is coupled to the rail and extends circumferentially around the central axis. The ring defines a ring gap within the ring. When the ring is received within the notch of the rail, the notch biases the ring against rotation such that the ring gap and rail gap are spaced apart from each other in a circumferential direction.

Another embodiment of the invention relates to an inverted V-block, two-stroke engine that includes a crankcase, a cylinder, a piston, and a ring assembly. The cylinder is coupled to the crankcase. The cylinder extends along and is centered on an axis. The piston also extends along and is centered on the axis. The piston includes a piston head and a piston skirt. The piston skirt extends between the piston head and the crankcase. The piston skirt has a first end and a second end opposite from the first end. The first end is coupled to the piston head, while the second end is located adjacent to the crankcase. The ring assembly is coupled to the second end of the piston skirt. The ring assembly includes a rail and an annular ring. The rail extends circumferentially around the axis and has a notch defined within the rail. The annular ring extends circumferentially around the axis and is coupled to the rail. When the annular ring is received within the notch, the annular ring and the rail are biased against rotating with respect to each other.

Additional features and advantages will be set forth in the detailed description which follows and will be readily apparent to those skilled in the art from the description and/or shown in the accompanying drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments. In addition, alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of a piston assembly for a diesel engine are shown. Standard oil control rings for an engine include a small gap in the ring circumference. This gap may present a gravitational leak path for oil in an inverted engine, which may allow oil to migrate from the crankcase into other areas of the engine. Oil migration, apart from generating wasted oil, may result in engine performance issues, including hydrolocking on start-up and oil entering the airbox.

In contrast, as discussed herein, Applicant has developed various piston assemblies that are believed to provide for various advantages over typical piston assemblies, including reducing oil migration, reducing blow-by gas emissions, and reducing the risk of the engine hydrolocking. Specifically, the piston assemblies herein include a gapless ring assembly located in the subport position; that is, the gapless ring assembly is located between the air ports and the crankcase. As such, the gapless ring assembly provides a barrier against the migration of oil from the crankcase further into the cylinder.

Though discussed namely in the context of an inverted engine, the piston assembly described herein is further applicable to opposed piston engines. Applicant has further found the piston assembly described here to improve the performance of a positive displacement oil pump powered dry sump, increase horsepower and torque, and extend engine life.

Figure 1:
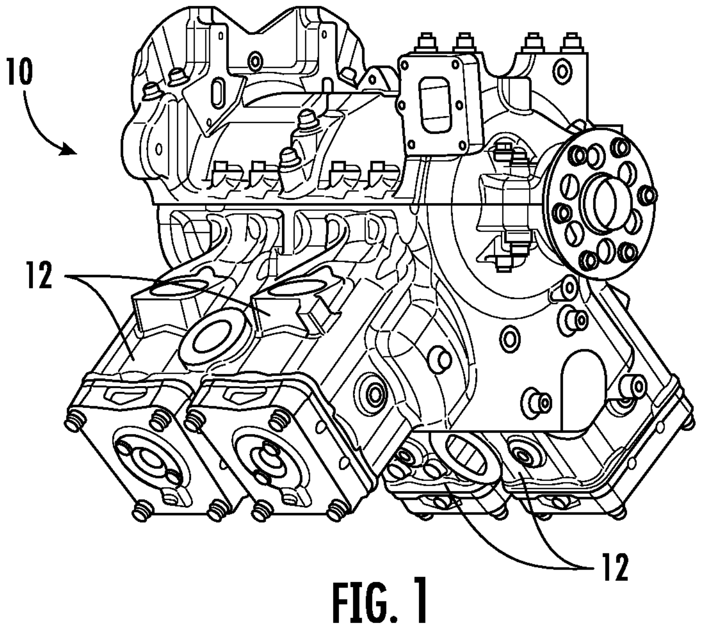
FIG. 1 is an isometric view of a two-stroke diesel engine in an inverted V-block orientation, according to an exemplary embodiment.

Referring to FIG. 1, an engine 10 is shown according to an exemplary embodiment. As shown in FIG. 1, engine 10 is a two-stroke diesel engine that is oriented in an inverted V-block configuration. V-block engine configurations include cylinders on an upper or top side of the engine that extend in a generally upward direction. In contrast to a V-block engine, cylinders 12 of engine 10 are positioned on a lower or bottom side of the engine and extend in a generally downward direction. Applicant has found that this orientation provides improved visibility when used with certain vehicles. For example, when engine 10 is mounted with a propeller in an aircraft, the pilot is better able to see around engine 10, since cylinders 12 that would otherwise obstruct visibility are located further away from the pilot's line of sight. Further, the orientation of engine 10 is such that engine 10 is narrowest in the pilot's line of sight.

Figure 2:
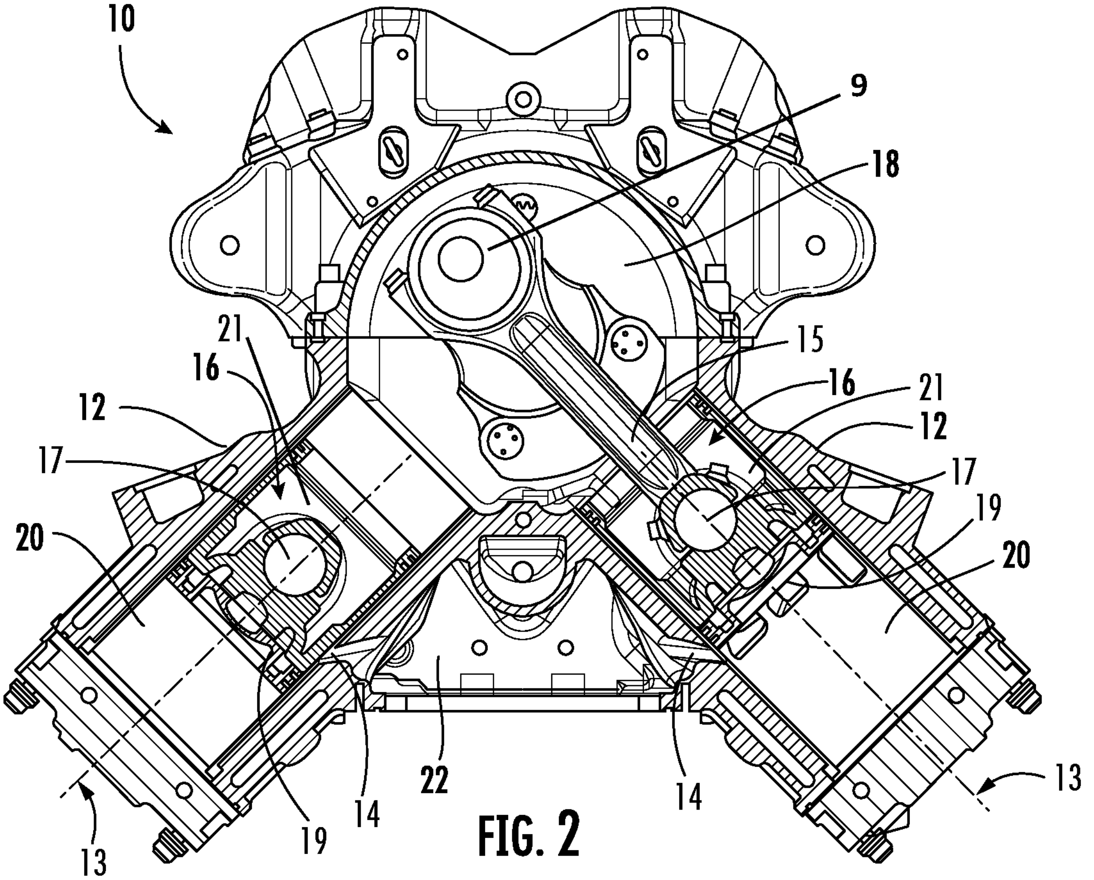
FIG. 2 is a front cross-sectional view of a portion of the engine shown in FIG. 1, according to an exemplary embodiment.

Referring to FIG. 2, two cylinders 12 of engine 10 are shown in an inverted V-block configuration. Each cylinder 12 is coupled to crankcase 18 and extends away from crankcase 18 in a generally downward direction along an axis 13. Each cylinder 12 houses a piston 16. Piston 16 extends along and is centered on axis 13. Each piston 16 is generally cylindrical in shape with a first longitudinal end nearest the combustion chamber 20 of cylinder 12 and a second longitudinal end nearest the crankcase 18 of engine 10. Piston 16 is connected to crankshaft 9 through connecting rod 15. Connecting rod 15 is coupled to a wrist pin 17, which is received within piston 16. Connecting rod 15 extends from wrist pin 17 to the crankshaft 9 located in the crankcase 18. Connecting rod 15 and wrist pin 17 allow piston 16 to travel axially within cylinder 12 as crankshaft 9 rotates within crankcase 18.

Piston 16 includes a piston cap or piston head 19 located at the first longitudinal end of the piston 16. Piston head 19 distributes the energy produced by combustion to the other areas of the piston through pushing against connecting rod 15 and moving crankshaft 9. Extending between piston head 19 and the second longitudinal end of piston 16 is a piston skirt 21. Piston skirt 21 has a first end coupled to piston head 19. Piston skirt 21 has a second end which terminates at the second longitudinal end of piston 16. Piston skirt 21 stabilizes wrist pin 17 and minimizes horizontal movement of piston 16 within cylinder 12.

As piston 16 travels within cylinder 12, piston skirt 21 passes over air ports 14 of cylinder 12. However, when the engine is not being operated piston head 19 may remain below air ports 14, specifically, between air ports 14 and crankcase 18. As described above, gravity can draw oil from crankcase 18 into cylinder 12. Absent a barrier positioned between crankcase 18 and air ports 14, oil that enters cylinder 12 can continue to migrate either into combustion chamber 20 or through air ports 14 to the airbox 22 of engine 10.

Figure 3:
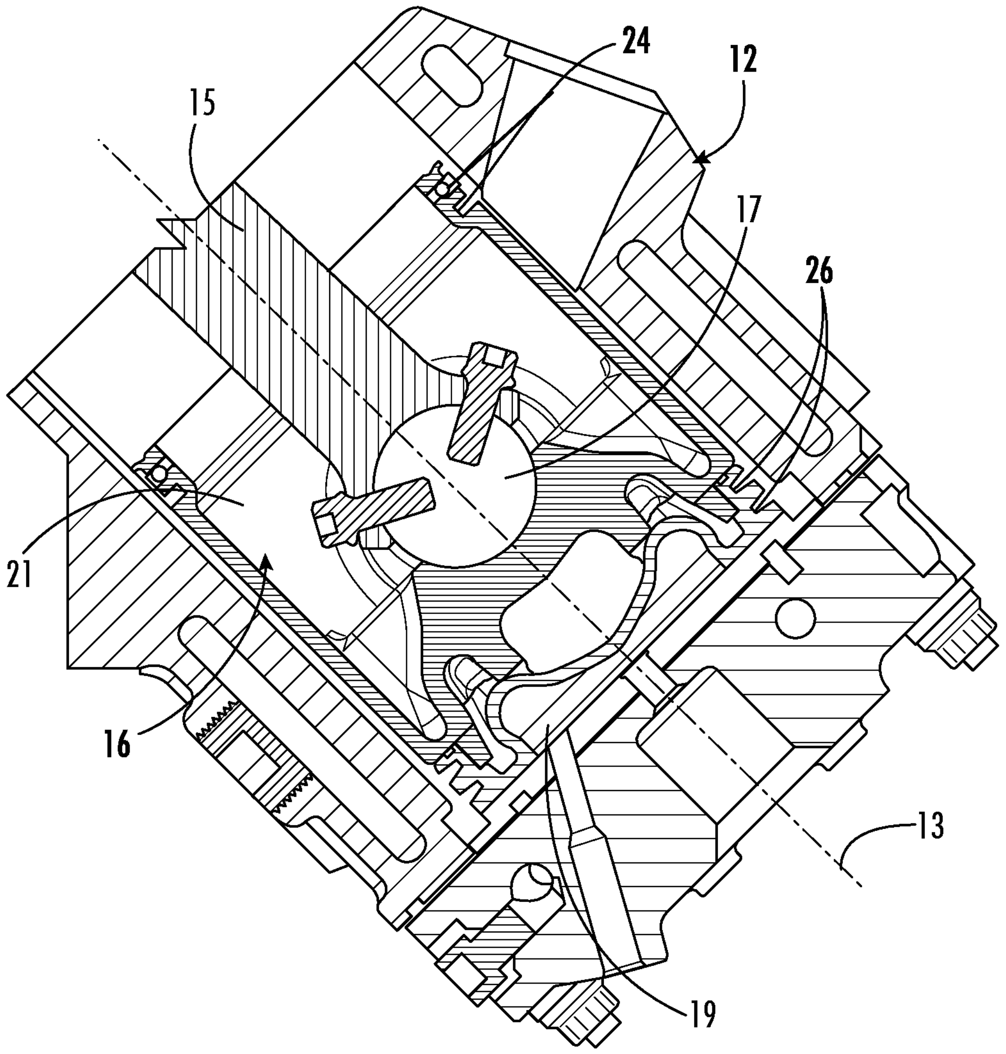
FIG. 3 is another front cross-sectional view of a portion of the engine shown in FIG. 1, according to an exemplary embodiment.
Figure 4:
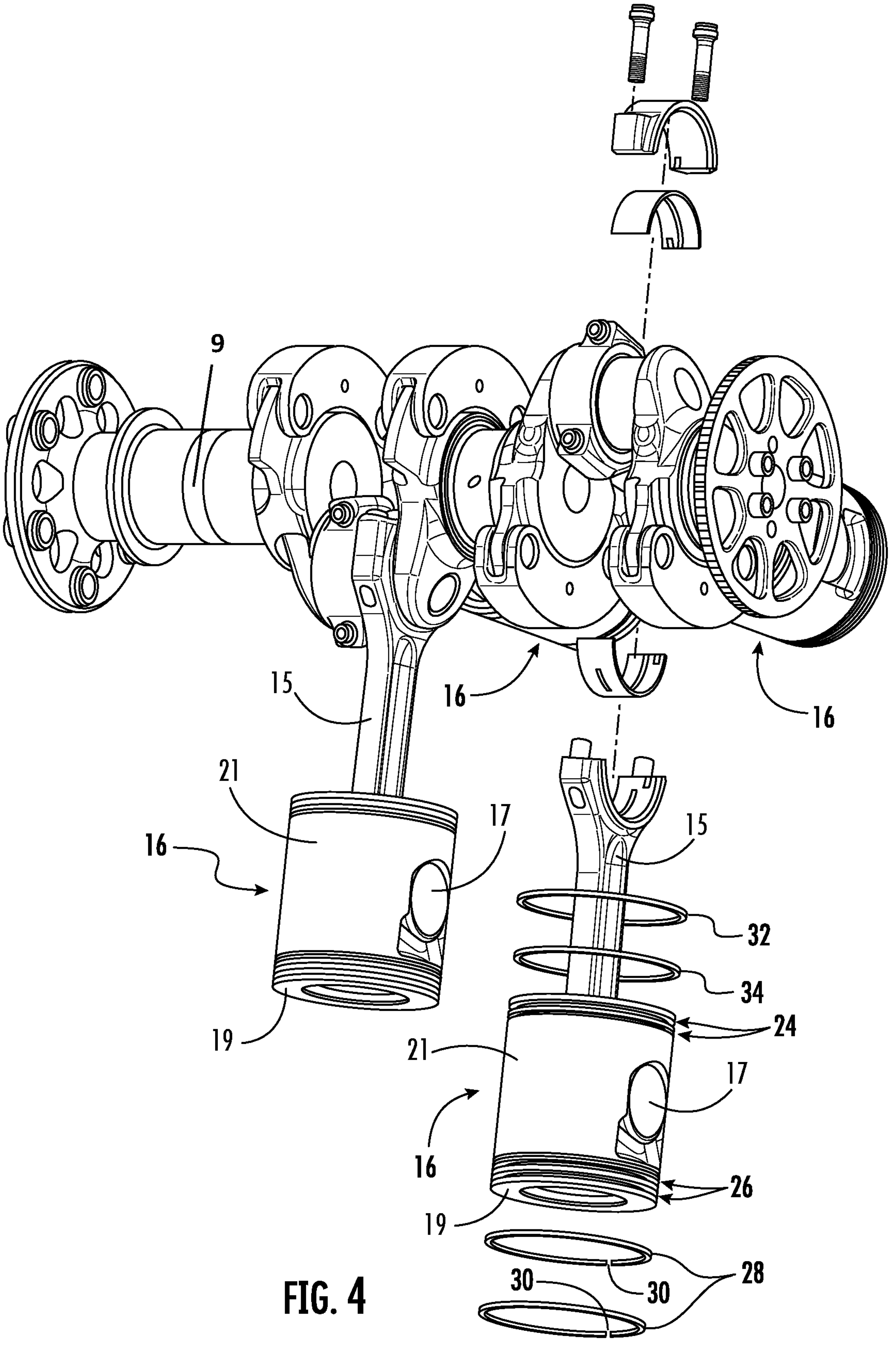
FIG. 4 is a schematic perspective view from below of a plurality of piston assemblies coupled to a connecting rod of the engine shown in FIG. 1, showing one of the plurality of piston assemblies exploded, according to an exemplary embodiment.

Referring to FIGS. 3-4, piston 16 is shown in greater detail. FIG. 3 shows piston 16 located at the top of its stroke within cylinder 12. In specific embodiments, two oil control ring grooves 24 and two compression ring grooves 26 are formed in an exterior surface of piston 16. Oil control ring grooves 24 are positioned proximate to the second longitudinal end of piston 16 on the piston skirt 21. Oil control ring grooves 24 are located in the subport position; that is oil control ring grooves 24 are located away from combustion chamber 20 and between air ports 14 and crankcase 18. Compression ring grooves 26 are positioned proximate to the first longitudinal end of piston 16 on the piston head 19. Alternatively, compression ring grooves may be located on the piston skirt 21 proximate to the piston head 19.

Referring to FIG. 4, a compression ring 28 is positioned within each compression ring groove 26. A circumferential gap 30 aids in positioning each compression ring 28 into a respective compression ring groove 26. As used herein, the phrase "circumferential gap" refers to a gap formed in the circumference of a substantially annular ring between a first circumferential end and a second circumferential end of the ring. Oil control rings 32 and 34 are respectively positioned within oil control ring grooves 24. In specific embodiments, a gapped oil control ring 32, specifically an oil control ring including a single ring with a circumferential gap similar to circumferential gap 30, and a gapless oil control ring assembly 34 are positioned within respective oil control ring grooves 24. In certain specific embodiments, the positions of gapped ring 32 and gapless ring assembly 34 is interchanged, specifically, gapless ring assembly 34 is positioned in the oil control ring groove 24 nearest to the crankcase, rather than in the oil control ring groove 24 farthest from the crankcase as shown in FIG. 4.

Generally, oil control rings are positioned toward the first longitudinal end of piston 16, closest to combustion chamber 20 (i.e., furthest from crankcase 18) and adjacent to compression rings 28. In contrast, the subport position places oil control rings 32 and 34 between air ports 14 of cylinder 12 and crankcase 18, or toward the second longitudinal end of piston 16 closest to crankcase 18. More specifically, gapless ring assembly 34 may be located on piston skirt 21 and between wrist pin 17 and crankcase 18. This positioning allows the induction air pressure from air in airbox 22 to seal gapless ring assembly 34 against the surrounding cylinder wall. The seal formed between the gapless ring assembly 34 and the cylinder wall prevents the excessive transfer of induction air from airbox 22 to crankcase 18.

In certain embodiments, gapless ring assembly 34 is located a distance from wrist pin 17 between 1.6 inches and 1.8 inches. More specifically, gapless ring assembly 34 is located 1.714 inches from wrist pin 17. In other embodiments, gapless ring assembly 34 is located a distance from second longitudinal end of piston 16. The distance is between 100.2% and 102% of the total distance piston 16 travels from the top of its stroke to the bottom of its stroke. More specifically, the distance is 100.6% of the total distance that piston 16 travels. In certain specific embodiments gapless ring assembly 34 is located 0.096 inches to 0.10 inches from the second end of piston skirt 21. That is, gapless ring assembly 34 may be located 0.096 inches to 0.10 inches from the second longitudinal end of piston 16. In other embodiments, gapless ring assembly 34 is located a distance 0.08 inches to 0.12 inches from air port 14 when piston 16 is at the top of its stroke. More specifically, gapless ring assembly 34 is 0.098 inches from air port 14.

During engine operation, compression rings 28 are pressurized by combustion pressure from the combustion gases attempting to escape combustion chamber 20. The combustion gases flow into compression ring groove 26 and behind compression ring 28, driving compression ring 28 into the surface of cylinder 12 with a given force. Gapless oil control ring assembly 34, positioned in a subport position, farther from combustion chamber 20, is driven into the wall of cylinder 12 by a combination of induction air pressure and self-pressure from the inherent outward bias of gapless ring assembly 34 toward cylinder 12. The induction air pressure is generated from the flow of inlet gases into oil control ring groove 24 and behind gapless oil control ring 34. However, the induction air pressure applied to gapless oil control ring assembly 34, positioned in an oil control ring groove 24, is less than the combustion pressure that is applied to compression rings 28 positioned in compression ring groove 26. As such, to drive gapless ring assembly 34 against the wall of cylinder 12 with a similar amount of force to compression rings 28, the surface area of gapless ring assembly 34 is increased. As such, gapless oil control ring 34 includes an increased height compared to oil control ring 32 and compression rings 28.

Referring to FIGS. 5-16, gapless ring assembly 34 and the components thereof are shown in greater detail. FIGS. 5-10 show various views of an assembled gapless oil control ring 34. Gapless ring assembly 34 includes a rail 36 coupled to an annular ring 38 such that rail 36 and annular ring 38 share a central axis 35. When coupled to piston 16, central axis 35 and axis 13 are substantially aligned with each other.

Both rail 36 and ring 38 are substantially annular or ring-shaped. Both rail 36 and ring 38 extend in a circumferential direction around central axis 35. A circumferential rail gap 42 is formed in rail 36, and a circumferential ring gap 44 is formed in ring 38. When gapless ring assembly 34 is assembled, rail 36 and ring 38 are aligned in such a way that circumferential rail gap 42 and circumferential ring gap 44 do not overlap. Specifically, rail gap 42 and ring gap 44 are circumferentially spaced apart from each other such that ring gap 44 is not aligned with rail gap 42 in a direction parallel to central axis 35.

Figure 5:
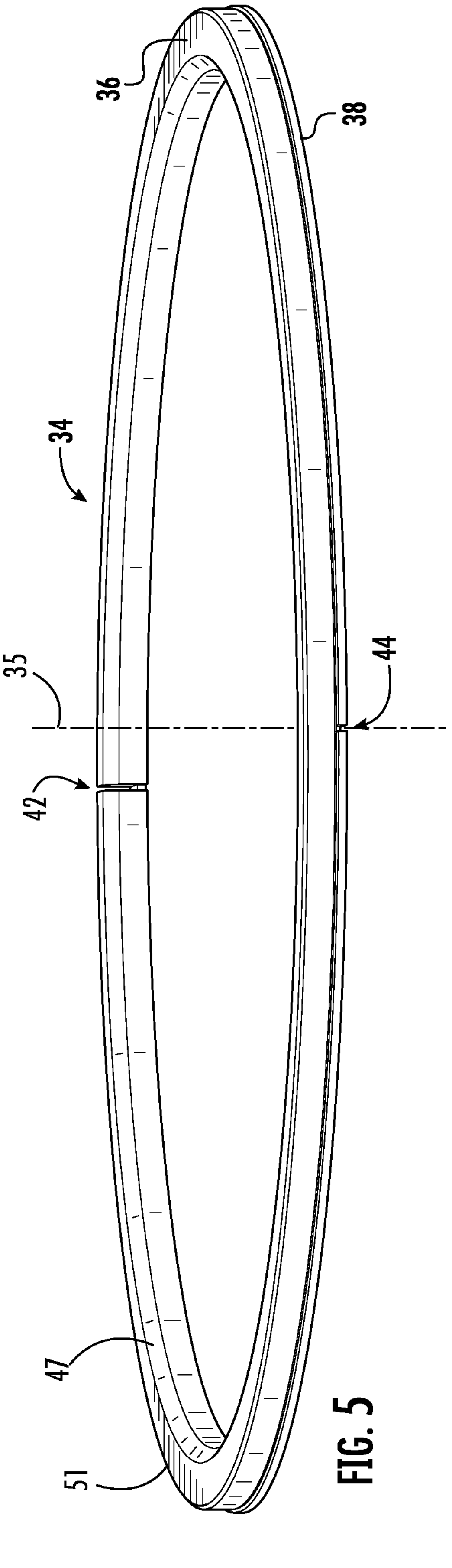
FIG. 5 is a perspective view from the front of a gapless ring assembly, according to an exemplary embodiment.
Figure 6:
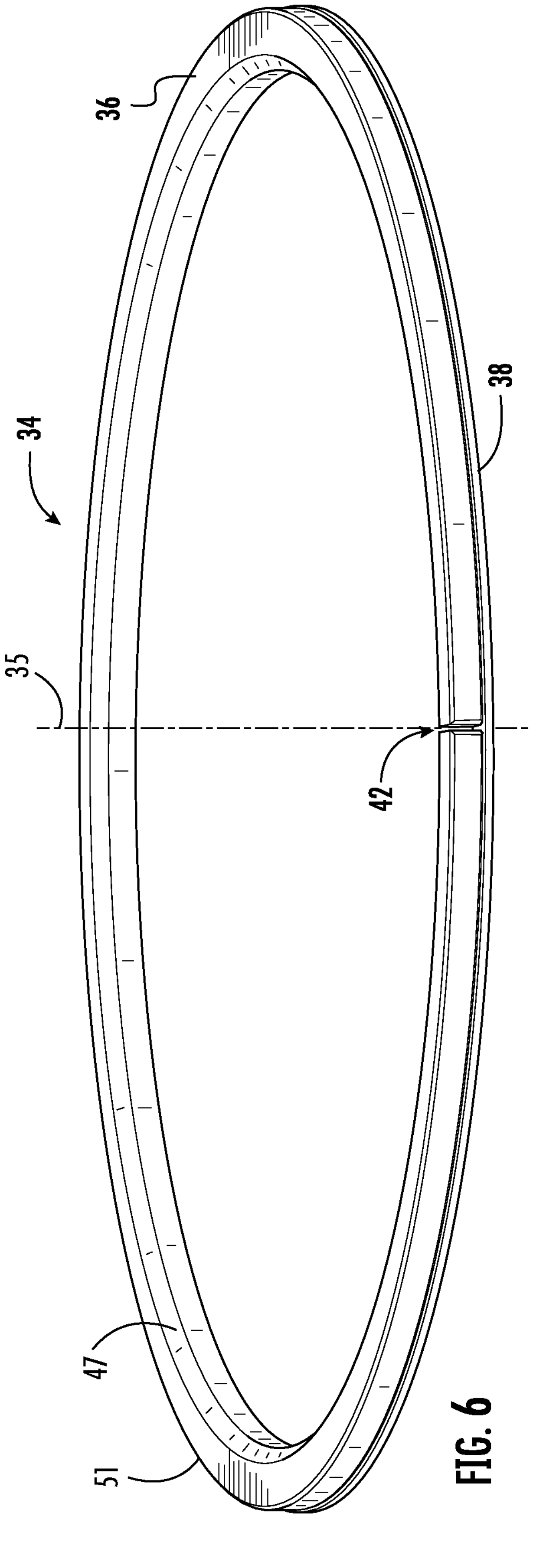
FIG. 6 is a perspective view from the rear of the gapless ring assembly shown in FIG. 5, according to an exemplary embodiment.
Figure 7:
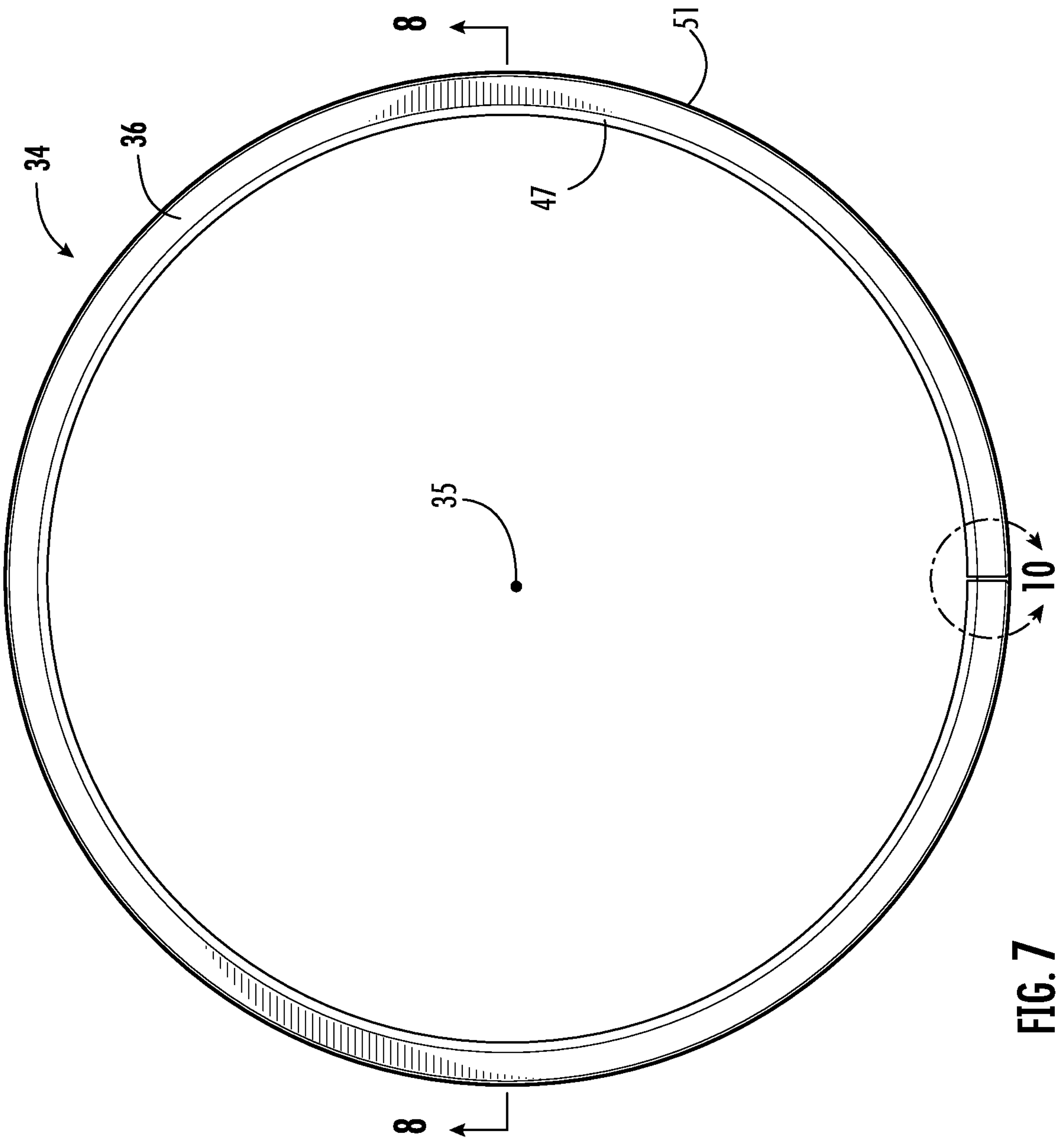
FIG. 7 is a top view of the gapless ring assembly shown in FIG. 5, according to an exemplary embodiment.
Figure 8:
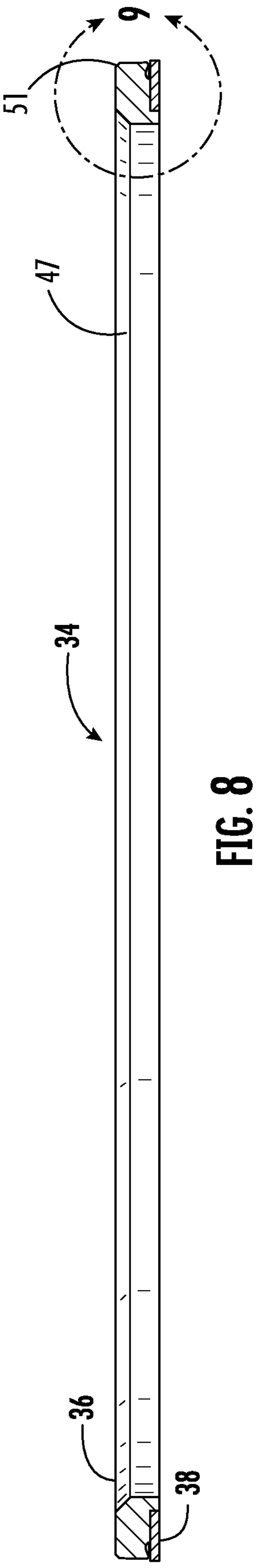
FIG. 8 is a front cross-sectional view of the gapless ring assembly shown in FIG. 5, according to an exemplary embodiment.

In certain embodiments, circumferential rail gap 42 is positioned between 90 degrees and 180 degrees from circumferential ring gap 44 in the circumferential direction about gapless ring assembly 34. More specifically, circumferential rail gap 42 may be positioned between 175 degrees and 180 degrees from circumferential ring gap 44. Even more specifically, as shown in FIG. 5, circumferential rail gap 42 is positioned approximately 180 degrees from circumferential ring gap 44.

Figure 9:
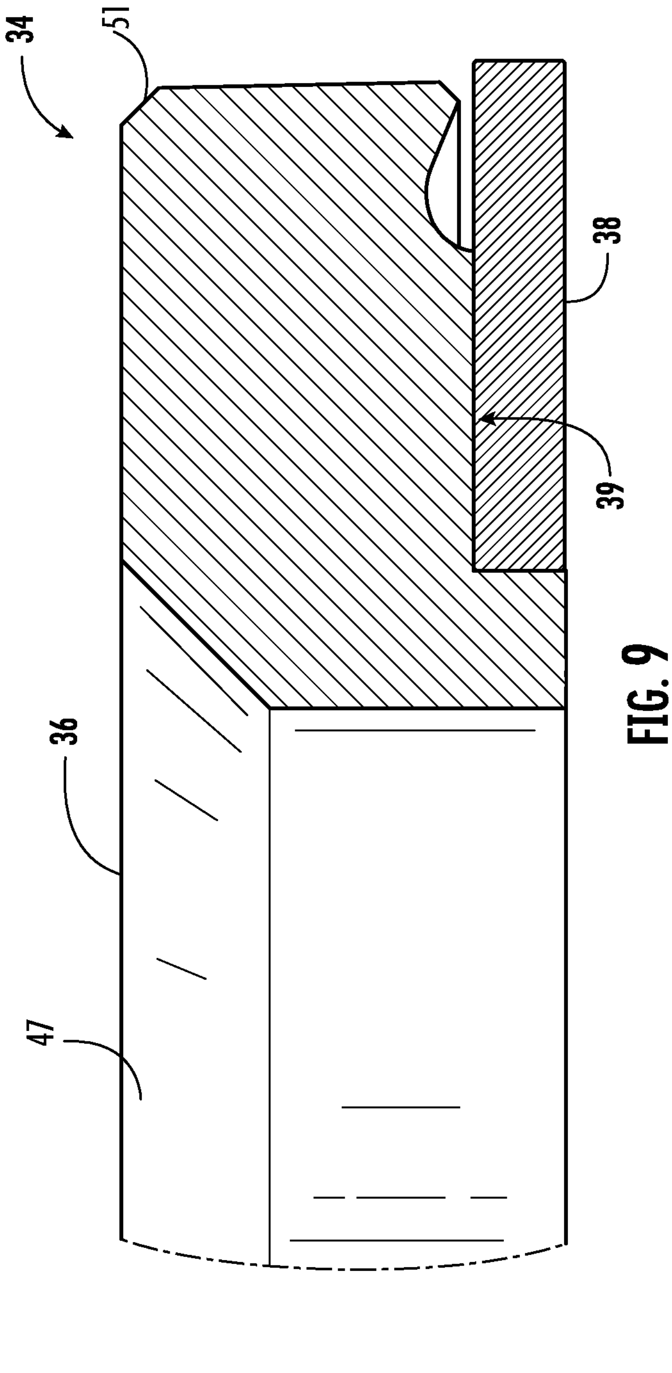
FIG. 9 is a detailed cross-sectional view of the gapless ring assembly shown in FIG. 8, according to an exemplary embodiment.

Referring to FIG. 9, ring 38 nests within a notch 39 formed in rail 36. Notch 39 biases ring 38 and rail 36 against rotating with respect to each other. Specifically, when ring 38 is received within notch 39, notch 39 biases ring 38 against rotation such that ring gap 44 and rail gap 42 are spaced apart from each other in a circumferential direction.

Figure 10:
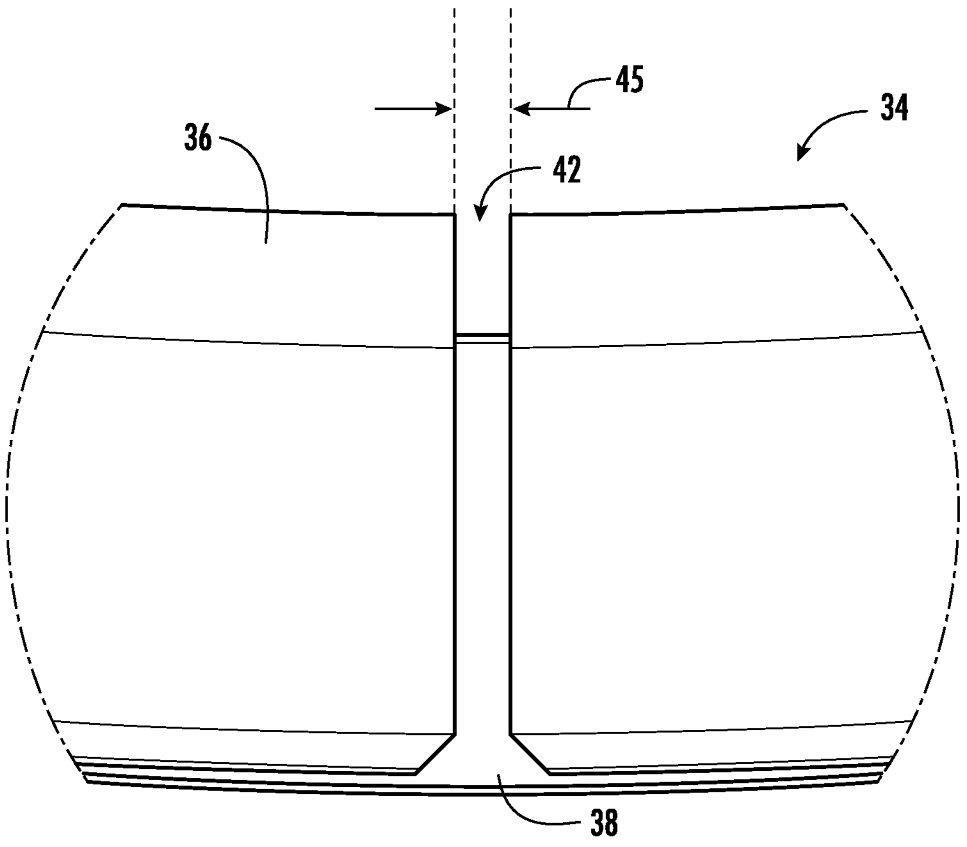
FIG. 10 a detailed top view of the gapless ring assembly shown in FIG. 7, according to an exemplary embodiment.
Figure 11:
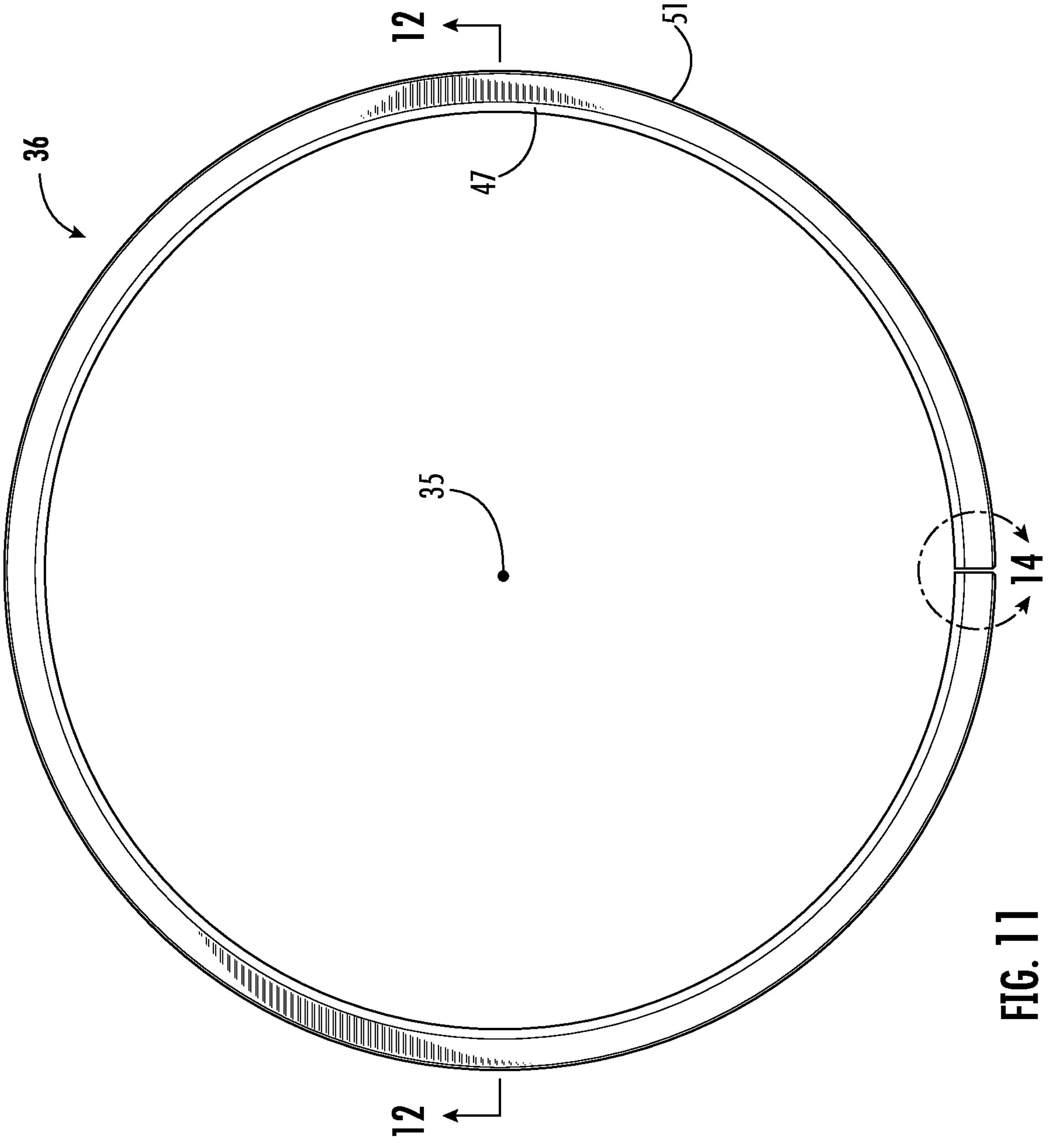
FIG. 11 is a top view of the rail of the gapless ring assembly shown in FIG. 5, according to an exemplary embodiment.
Figure 12:
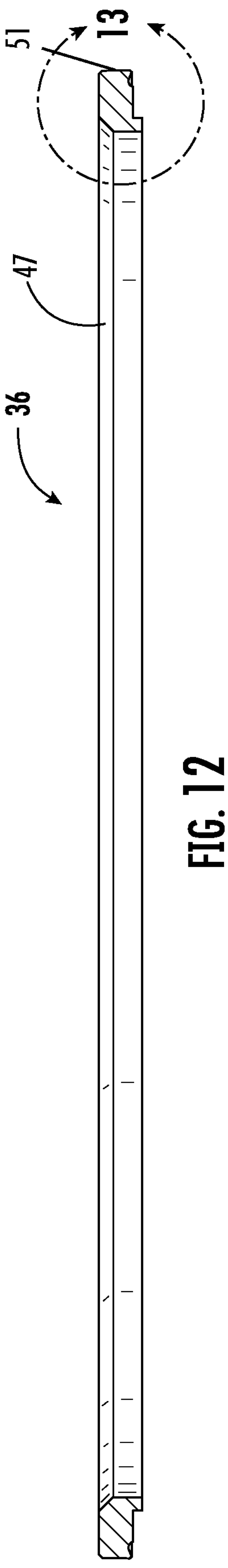
FIG. 12 is a front cross-sectional view of the rail shown in FIG. 11, according to an exemplary embodiment.

Referring to FIG. 10, the circumferential rail gap 42 has a width 45 of 0.012 inches to 0.020 inches.

Figure 13:
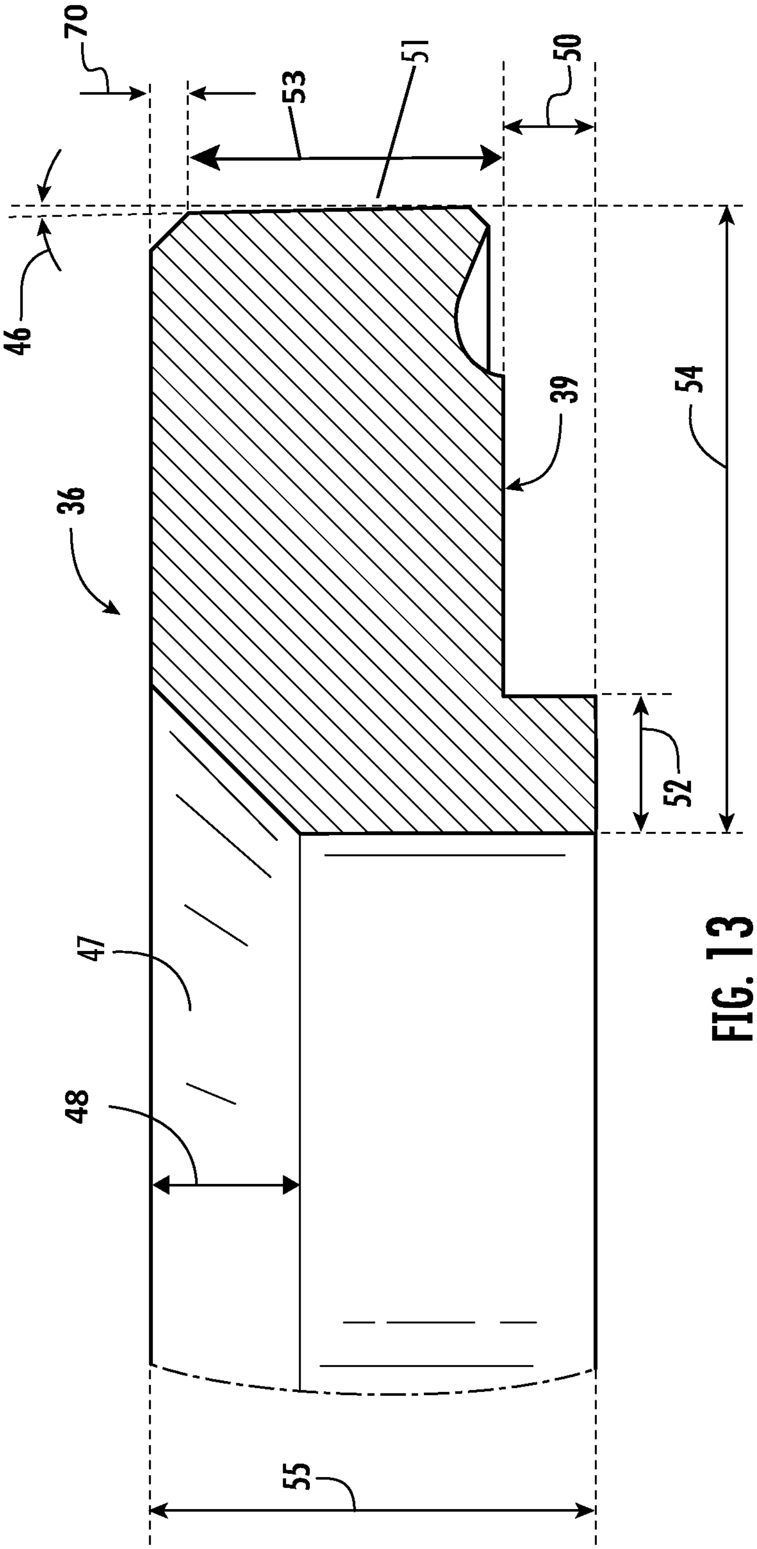
FIG. 13 is a detailed cross-sectional view of the rail shown in FIG. 12, according to an exemplary embodiment.
Figure 14:
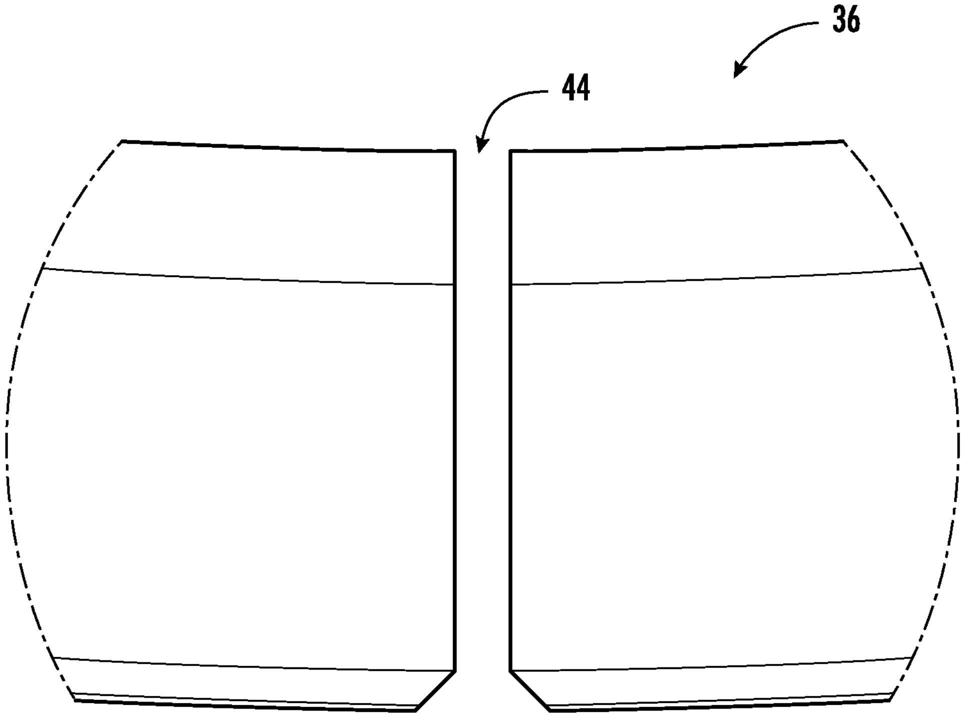
FIG. 14 a detailed top view of the rail shown in FIG. 11, according to an exemplary embodiment.

Referring to FIGS. 11-14, rail 36 is shown in greater detail. Referring to FIG. 13, a cross-sectional segment of rail 36 is shown. Rail 36 has a width 54 and a height 55. In specific embodiments, rail 36 has a width 54 of 0.150 inches to 0.170 inches and a height 55 of 0.1120 inches to 0.1170 inches. More specifically, rail 36 has a width of 0.165+/−0.010 inches and a height of 0.1165+/−0.0005 inches.

Further, notch 39, which receives ring 38, has a height 50. Notch 39 defines a width 52, which includes the portion of rail 36 positioned between the notch 39 and the interior of rail 36. In specific embodiments, height 50 of notch 39 is 0.010 inches to 0.030 inches. More specifically, notch 39 has a height 50 of 0.024 inches. In specific embodiments, width 52 of notch 39 is 0.036 inches.

In certain specific embodiments, the exterior surface of rail 36 includes an oil scraping surface. As shown, the exterior surface of rail 36 includes a positive twist with a tapered face 51. Tapered face 51 is angled inward toward the center of rail 36 by an angular dimension 46. Specifically, the exterior surface of the rail is angled inward towards central axis by angular dimension 46. In certain embodiments, angular dimension 46 is of approximately 1 degree to 4 degrees. More specifically, angular dimension 46 is angled 1 degree to 2 degrees. In certain specific embodiments, angular dimension has a height 70 of 0.010 inches. Tapered face 51 has a height 53 that is a portion of height 55. As shown in FIG. 13, the exterior surface of rail 36 further includes a chamfered edge 47 having a height 48. Chamfered edge 47 is a cut-away slopping edge. As shown, chamfered edge 47 is angled at an approximately 45 degree angle inwards away from central axis 35. In certain specific embodiments, chamfered edge 47 has a height 48 of 0.020 inches to 0.050 inches. More specifically, height 48 is 0.039 inches.

Tapered face 51 of the exterior surface of rail 36 aid in transporting oil up and down cylinder 12 during operation of engine 10, lubricating cylinder 12 as piston 16 travels away from crankcase 18, and scraping excess oil back toward crankcase 18 as piston 16 moves in the opposite direction. In other specific embodiments, the exterior surface of rail 36 includes various other forms of tapered faces and chamfered edges. In further specific embodiments, tapered face 51 is tapered away from the center of rail 36, rather than toward central axis 35 of rail 36.

Figure 15:
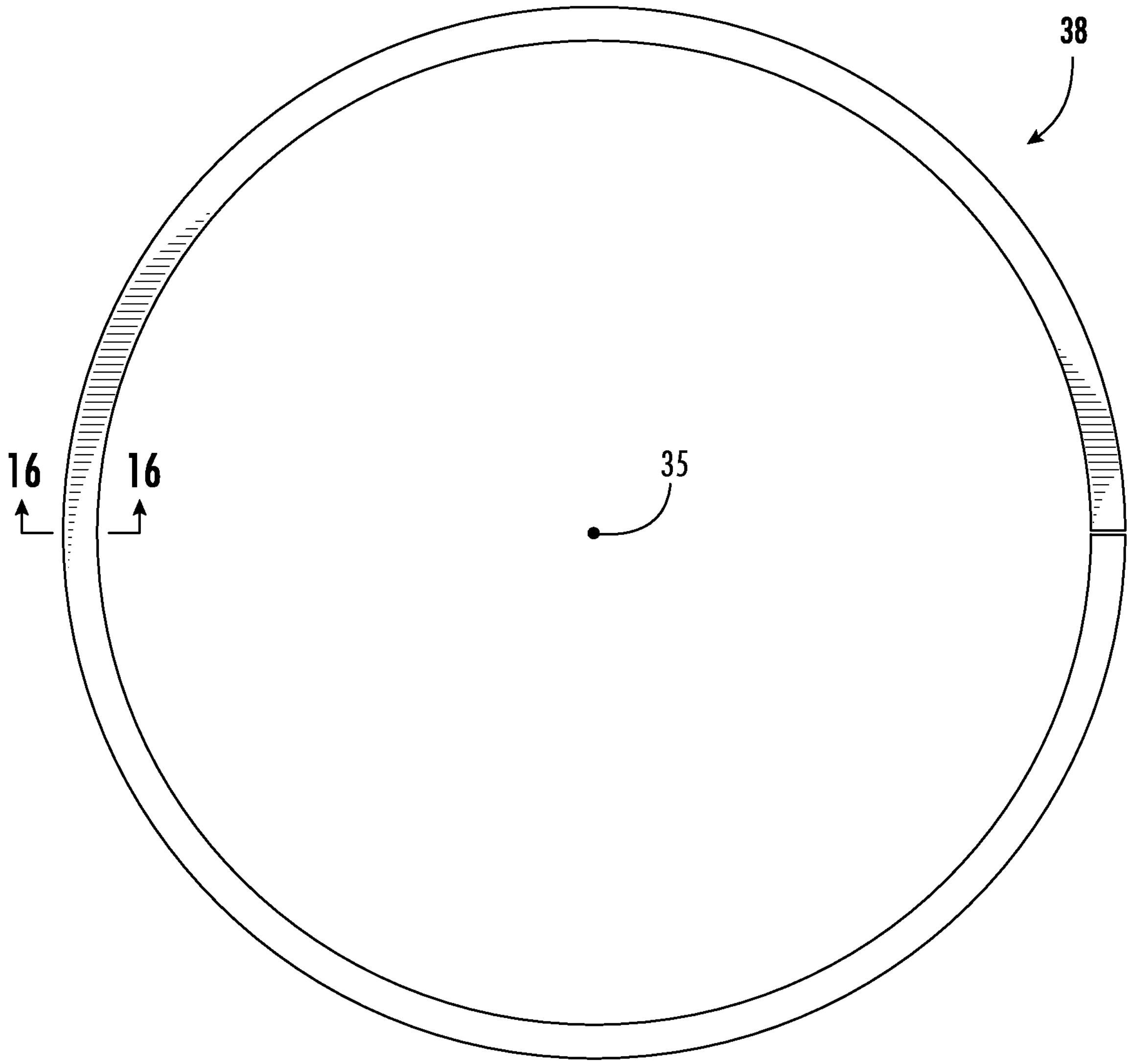
FIG. 15 is a top view of the annular ring of the gapless ring assembly shown in FIG. 5, according to an exemplary embodiment.
Figure 16:
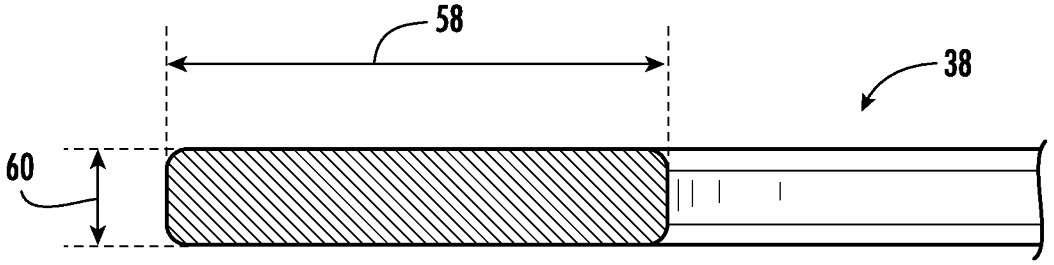
FIG. 16 is a side cross-sectional view of the annular ring shown in FIG. 15, according to an exemplary embodiment.

Referring to FIGS. 15-16, ring 38 is shown in greater detail. Referring to FIG. 16, a cross-sectional segment of ring 38 is shown. Ring 38 has a width 58 and a height 60. In specific embodiments, width 58 is 0.100 inches to 0.140 inches. More specifically, width is 0.132 inches. In other embodiments, height 60 is 0.010 inches to 0.030 inches and, more specifically, 0.024 inches. Height 60 generally corresponds to the height 50 of notch 39. As such, in certain embodiments, height 60 and height 50 are equal.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as"), provided herein is intended merely to better illuminate the invention and does not pose a limitation on the scope of the invention unless otherwise claimed. No language in the specification should be construed as indicating any non-claimed element as essential to the practice of the invention.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes, and omissions may also be made in the design, operating conditions, and arrangement of the various exemplary embodiments without departing from the scope of the present invention.

What is claimed:

1. An inverted V-block, two-stroke engine, comprising:

a crankcase;

a cylinder coupled to the crankcase, the cylinder extending along and centered on an axis;

a piston extending along and centered on the axis, the piston comprising:

a piston head; and a piston skirt extending between the piston head and the crankcase, the piston skirt having a first end and a second end opposite the first end, the second end adjacent to the crankcase; and a ring assembly coupled to an exterior of the piston skirt at the second end, the ring assembly comprising:

a rail extending circumferentially around the axis and comprising a first circumferential end and a second circumferential end opposite the first circumferential end, and a notch extending along the rail between the first circumferential end and the second circumferential end, the rail defining a rail gap between the first circumferential end and the second circumferential end;

an annular ring coupled to the rail and positioned such that the annular ring is received in the notch of the rail, the annular ring extending circumferentially around the axis and defining a ring gap within the annular ring; and wherein the rail gap and ring gap are circumferentially spaced apart from each other such that the ring gap is not aligned with the rail gap in a direction parallel to the axis.

2. The engine of claim 1, wherein the ring gap and the rail gap are spaced apart between 90 degrees and 180 degrees.

3. The engine of claim 2, wherein the ring gap and the rail gap are spaced apart between 175 degrees and 180 degrees.

4. The engine of claim 1, further comprising an air port, wherein the ring assembly is located between the air port and the crankcase.

5. The engine of claim 4, wherein, when the first end of the piston skirt is positioned within the cylinder furthest from the crankcase, the ring assembly is located 0.08 inches to 0.12 inches from the air port.

6. The engine of claim 1, wherein the ring assembly is located 0.096 inches to 0.10 inches from the first end.

7. A piston assembly for use within a cylinder of a diesel engine, the piston assembly comprising:

a piston head defining an axis;

a piston skirt centered on and extending along the axis, and having a first end and a second end, the first end coupled to the piston head;

a rail coupled to an exterior of the piston skirt proximate to the second end of the piston skirt and extending circumferentially around the axis, the rail comprising a first circumferential end and a second circumferential end opposite the first circumferential end, wherein the first circumferential end and the second circumferential end are separated by a rail gap, and wherein a notch is defined along the rail and extends between the first circumferential end and the second circumferential end;

a ring coupled to the rail and extending circumferentially around the axis, the ring defining a ring gap within the ring; and wherein, when the ring is received within the notch, the notch biases against rotation of the ring such that ring gap and rail gap are spaced apart from each other in a circumferential direction.

8. The piston assembly of claim 7, wherein the ring has a height of 0.010 inches to 0.030 inches.

9. The piston assembly of claim 7, wherein the notch has a height of 0.010 inches to 0.030 inches.

10. The piston assembly of claim 7, wherein the rail has a width of 0.150 inches to 0.170 inches.

11. The piston assembly of claim 7, wherein the rail has a height of 0.1120 inches to 0.1170 inches.

12. The piston assembly of claim 7, wherein the rail has a height of 0.1160 inches to 0.1170 inches.

13. An inverted V-block, two-stroke engine, comprising:
a crankcase;
a cylinder coupled to the crankcase, the cylinder extending along and centered on an axis;
a piston extending along and centered on the axis, the piston comprising:
a piston head; and
a piston skirt extending between the piston head and the crankcase, the piston skirt having a first end and a second end opposite the first end, the second end adjacent to the crankcase; and
a ring assembly coupled to the second end, the ring assembly comprising:
a rail extending circumferentially around the axis, the rail comprising a first circumferential end and a second circumferential end opposite the first circumferential end and defining a notch extending along the rail between the first circumferential end and the second circumferential end; and
an annular ring extending circumferentially around the axis and coupled to the rail; and
wherein, when the annular ring is received within the notch, the annular ring and rail are biased against rotating with respect to each other.

14. The engine of claim 13, wherein the rail includes a rail gap, and the annular ring includes a ring gap, wherein the rail gap and ring gap are circumferentially spaced apart from each other such that the ring gap is not aligned with the rail gap in a direction parallel to the axis.

15. The engine of claim 13, wherein the annular ring has a height equal to a height of the notch.

16. The engine of claim 15, wherein the height of the annular ring is 0.010 inches to 0.030 inches.

17. The engine of claim 13, wherein an exterior surface of the rail is angled inward towards the axis.

18. The engine of claim 17, wherein the exterior surface is angled at 1 degree to 4 degrees.

19. The engine of claim 17, wherein the exterior surface is angled at 1 degree to 2 degrees.

20. The engine of claim 17, wherein the rail further includes a chamfered edge angled towards the axis.

* * * * *